US009297160B2

(12) United States Patent
Cangiano et al.

(10) Patent No.: US 9,297,160 B2
(45) Date of Patent: Mar. 29, 2016

(54) COMPOSITE PANEL MADE FROM CEMENTITIOUS MORTAR WITH PROPERTIES OF TRANSPARENCY

(75) Inventors: Stefano Cangiano, Torre de Roveri (IT); Aronne Carminati, Medolago (IT)

(73) Assignee: ITALCEMENTI S.P.A., Bergamo (IT)

( * ) Notice: Subject to any disclaimer, the term of this patent is extended or adjusted under 35 U.S.C. 154(b) by 396 days.

(21) Appl. No.: 13/133,772

(22) PCT Filed: Dec. 10, 2009

(86) PCT No.: PCT/EP2009/066813
§ 371 (c)(1),
(2), (4) Date: Jun. 9, 2011

(87) PCT Pub. No.: WO2010/066831
PCT Pub. Date: Jun. 17, 2010

(65) Prior Publication Data

US 2011/0244181 A1 Oct. 6, 2011

(30) Foreign Application Priority Data

Dec. 11, 2008 (IT) .............................. MI2008A2190

(51) Int. Cl.

| | |
|---|---|
| ***B32B 3/30*** | (2006.01) |
| ***B28B 1/14*** | (2006.01) |
| ***B28B 7/18*** | (2006.01) |
| ***B28B 7/36*** | (2006.01) |
| ***B28B 23/00*** | (2006.01) |
| ***E04C 1/42*** | (2006.01) |
| ***E04B 2/02*** | (2006.01) |
| ***E04C 2/54*** | (2006.01) |

(Continued)

(52) U.S. Cl.
CPC . *E04B 2/02* (2013.01); *B28B 23/00* (2013.01); *B28B 23/0037* (2013.01); *E04C 2/54* (2013.01); *B28B 1/008* (2013.01); *B28B 1/16* (2013.01); *B28B 7/18* (2013.01); *B28B 7/183* (2013.01); *B28B 7/36* (2013.01); *B28B 23/0056* (2013.01); *B28B 23/0075* (2013.01); *E04C 1/42* (2013.01); *E04C 2/044* (2013.01); *Y10T 428/162* (2015.01); *Y10T 428/22* (2015.01); *Y10T 428/24331* (2015.01); *Y10T 428/24612* (2015.01)

(58) Field of Classification Search
CPC .................................................. B28B 23/0037
See application file for complete search history.

(56) References Cited

U.S. PATENT DOCUMENTS 3,091,899 A 6/1963 Hans
4,570,207 A * 2/1986 Takahashi et al. ......... 362/153.1

(Continued)

FOREIGN PATENT DOCUMENTS

DE 1107579 B 5/1961
DE 3737116 A1 * 5/1989 ................ B44C 5/04

(Continued)

OTHER PUBLICATIONS

Machine Translation of JP 2008214961 A, Sep. 2008.*

(Continued)

*Primary Examiner* — Jeff Vonch
(74) *Attorney, Agent, or Firm* — Abelman, Frayne & Schwab

(57) ABSTRACT

The present invention relates to a composite panel made from cementitious mortar characterized in that a plurality of openings pass through its complete width, each of which is filled with a transparent to light material. The invention also relates to methods for producing this panel.

11 Claims, 2 Drawing Sheets

(51) Int. Cl.

| | |
|---|---|
| *B28B 1/00* | (2006.01) |
| *E04C 2/04* | (2006.01) |
| *B28B 1/16* | (2006.01) |

(56) References Cited

U.S. PATENT DOCUMENTS

| | | | | | |
|---|---|---|---|---|---|
| 4,659,527 | A * | 4/1987 | Kataishi | E04B 2/94 264/256 |
| 4,793,104 | A * | 12/1988 | Hultberg | E04C 1/42 52/127.3 |
| 6,082,886 | A * | 7/2000 | Stanford | 362/576 |
| 6,491,852 | B1 * | 12/2002 | Sedaka | 264/35 |
| 7,229,203 | B2 * | 6/2007 | Lath | G01V 8/10 362/153.1 |
| 8,091,303 | B2 | 1/2012 | Losconczi | |
| 2007/0074484 | A1 * | 4/2007 | Yin | B28B 23/0037 52/750 |
| 2007/0230209 | A1 | 10/2007 | Martin | |
| 2010/0130081 | A1 * | 5/2010 | Fischer | B29C 70/088 442/181 |

FOREIGN PATENT DOCUMENTS

| | | | | | |
|---|---|---|---|---|---|
| DE | 9310500 | U1 | | 3/1994 | |
| EP | 1970179 | A | | 9/2008 | |
| FR | 2040872 | A1 | * | 1/1971 | |
| FR | 2877736 | A | | 5/2006 | |
| FR | 2877736 | A1 | * | 5/2006 | E04H 4/0075 |
| GB | 358207 | A | * | 10/1931 | |
| JP | 01219251 | A | * | 9/1989 | |
| JP | 01235769 | A | * | 9/1989 | |
| JP | 05201755 | A | * | 8/1993 | |
| JP | 10292598 | A | * | 11/1998 | |
| JP | 2006224349 | A | * | 8/2006 | |
| JP | 2008214961 | A | * | 9/2008 | |
| RU | SU 682627 | A | * | 8/1979 | |
| WO | 9626055 | A1 | | 8/1996 | |
| WO | 03097954 | A | | 11/2003 | |
| WO | 2006070214 | A | | 7/2006 | |
| WO | WO 2008006488 | A2 | * | 1/2008 | |
| WO | WO 2008031610 | A1 | * | 3/2008 | B28B 1/522 |
| WO | WO 2009007765 | A2 | * | 1/2009 | E04C 1/42 |

OTHER PUBLICATIONS

PCT/EP2009/066813 International Search Report and Written Opinion, May 20, 2010, 10 pages.

PCT/EP2009/066813 International Preliminary Report on Patentability, Jan. 24, 2011, 9 pages.

* cited by examiner

COMPOSITE PANEL MADE FROM CEMENTITIOUS MORTAR WITH PROPERTIES OF TRANSPARENCY

CROSS-REFERENCE TO RELATED APPLICATIONS

This application is a national phase application under 35 USC §371 of PCT Patent Application Number PCT/EP2009/066813, which claims the benefit of Italian Patent Application Number IT2008MI02190 filed on Dec. 11, 2008, which are both incorporated by reference herein.

FIELD OF THE INVENTION

The present invention relates to a composite panel made from cementitious mortar with properties of transparency to light.

PRIOR ART

WO03097954 describes building blocks in material such as cementitious mortar through which optical fibres pass to allow the transmission of light from one side of the block to the other. In this way, it is possible to see the outline of objects placed at the back of the block, which is thus commonly defined transparent.

The optical fibres are placed as weft in meshes or special fabrics and thus inserted in castings of cementitious mortar within formworks to give obtain blocks of dimensions variable in relation to their final use. These blocks are then sawn to obtain plates or panels which subsequently undergo smoothing and polishing. Only after these operations is it possible to obtain the transparency effect described above.

However, this effect is influenced by the intensity of the incident light on the block. In fact, in relation to the luminous intensity of the light an angle of incidence is determined, for example already with an inclination of around 20° (for a panel thickness of around 3 cm), beyond which the transparency effect determined by transmission of light by the optical fibres decreases progressively, this forming an evident limitation of this technique.

There are other problems linked to the technique according to WO03097954, which is somewhat complex. In order to position the optical fibres, it is in fact necessary to provide a special fabric as backing to be inserted in consecutive layers in the formworks, alternated with layers of mortar; moreover, the further steps of sawing into thin plates and polishing are also required, which also lead to considerable risks of manufacturing scrap, especially if pieces of substantial dimensions are required, such as square plates of over one meter per side. Finally, it must be considered that only one type of surface finish can be obtained with this technique, which does not allow the appearance of the surface to be adapted to specific aesthetic and architectural requirements.

SUMMARY OF THE INVENTION

The object of the present invention is to solve the problems of prior art mentioned above. In particular, it is desirable to avoid additional manufacturing steps to simplify production, to avoid scrap and waste of material making it more economical, and to obtain the desired transparency effect also with respect to unfavourable angles of incident light, or light diffused by reflection having a more limited luminous intensity with respect to direct light.

To achieve these objects the present invention proposes a composite panel made from cementitious mortar, characterized in that a plurality of through openings pass throughout its thickness, said through openings being filled with a transparent to light material.

Said transparent to light material is preferably a plastic material.

This plastic material can be composed of: polyacrylates, epoxy resins or polycarbonates.

Alternatively, said transparent to light material can be glass or glass based.

In an embodiment of the invention, said transparent to light material is in the form of a preformed element which is housed in said opening.

In a different embodiment of the invention, said transparent to light material is in the form of an element formed in said opening, for example by casting.

The shape of the openings is variable within a wide range of geometries and the element of transparent to light material is also correspondingly variable: a preferred shape is that of a prism of rectangular cross section capable of housing a corresponding plate or sheet, preformed or obtained by casting.

In an embodiment of the invention said openings are intercalatedly lined up along parallel rows. Said openings are identified by the dimensions in length, height and depth. The height (h) of said openings necessarily matches the panel thickness, the length (L) of said openings preferably ranges between 0.5 and 100 mm, the thickness of said openings preferably ranges between 0.5 and 5 mm. Said openings are preferably arranged along parallel rows set apart from one another by a distance ranging between 0.3 and 0.5 times the length (L). In any case the minimum distance between two consecutive openings arranged on the same row must be no less than twice the maximum diameter of the aggregate present in said mortar.

The distance between two rows of parallel openings preferably ranges between 5 and 10 mm, and in any case must be no less than twice the maximum diameter of said aggregate.

For example, for a panel with dimensions of 0.5 m×1.0 m, a thickness of 5 cm and formed by cementitious mortar with a maximum aggregate diameter of 2 mm, assuming a length (L) of the openings of 40 mm, the distance between two consecutive openings arranged on the same row is 15 mm, while the distance between two consecutive parallel rows is 5 mm.

Preferably, said transparent to light material is treated with a coating having light reflection properties, for example a ceramic based acrylic emulsion or epoxy emulsion reflective paint to increase cohesion of the system.

Transport of light can be optimized through suitable surface means, such as a film, having light reflection characteristics and interposed between the transparent material and the opening in which it is housed.

The reflective film can, for example, be composed of a ceramic based reflective paint. The reflective film can be applied directly to the preformed elements of transparent material or, in the case of elements of transparent material obtained by casting, it can be applied to the walls of the openings before casting. The film can be applied with a spray technique on the preformed elements of transparent to light material or on the inner walls of the openings by forming the photoreflective film on cores used to form the openings. In this case the surface of the core must first be treated with suitable release agents in order to ensure adhesion of said photoreflective film to the surfaces of the opening and not the core. If said transparent to light material is in the form of a preformed element, such as a plate or sheet, obtained by cutting a plate of greater dimensions, the cut must be performed with techniques which ensure a roughness of the cut surface which does not limit optical transmission. Laser cutting is, for example, suitable for this purpose.

The present invention also relates to methods for forming said panel. In a first embodiment, a method for producing a panel comprises the steps of:

a) positioning in an orderly arrangement within a formwork a plurality of elements of said transparent to light material;
b) filling said formwork with said cementitious mortar until said plurality of elements of transparent to light material appears completely buried in it without contacting with said mortar the opposite sides of said elements, suitable to form the inlet and the outlet of said opening;
c) hardening said mortar setting free said opposite sides of said elements of transparent to light material, suitable to form the inlet and the outlet of said opening, and taking out the finished panel from the formwork.

In a second different embodiment, a method for producing a panel comprises the steps of:

d) filling a formwork with said cementitious mortar positioning in an orderly arrangement within said formwork a plurality of cores, preferably coated with release agent and photoreflective film, suitable to form said openings until said plurality of cores appears completely buried in said mortar without contacting the opposite sides of said cores, suitable to form the inlet and the outlet of said opening, with said mortar;
e) during the time period from the beginning to the end of the mortar setting, taking out said cores from said formwork setting free said thus formed openings;
f) if the cores were not coated with reflective film, the further step of coating the inside of said openings with a reflective paint, for example using spray methods;
g) filling said openings with said fluid state transparent to light material;
h) allowing the mortar and the transparent to light material to harden to afford said panel, and taking out the finished panel from the formwork;
i) allowing the panel to rest until it has hardened.

BRIEF DESCRIPTION OF THE DRAWINGS

In order to better understand the characteristics and advantages of the invention, non-limiting practical examples of embodiment are described below with reference to the figures of the accompanying drawings.

DETAILED DESCRIPTION OF THE INVENTION

Figure 4:
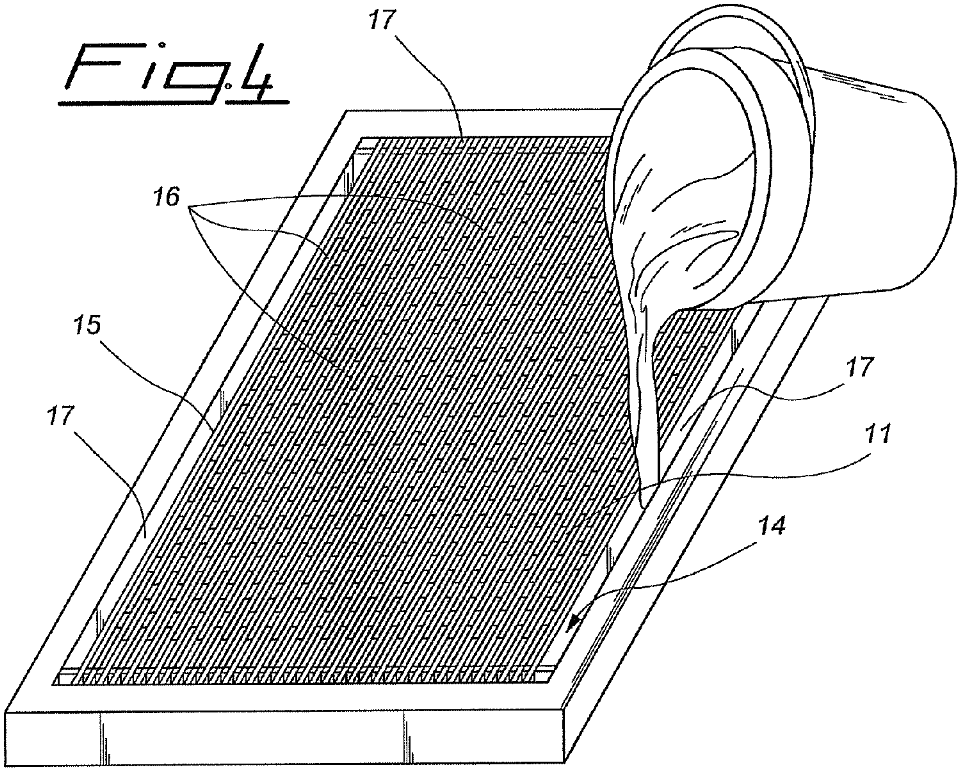
FIG. 4 schematically shows a perspective view of a step of one of the methods for producing the panel of FIG. 1.

With reference to FIGS. 1 to 4, a plurality of through openings 11, each containing a transparent to light material, pass throughout the thickness of a concrete panel 10, formed by cementitious mortar as described with regard to FIG. 4.

In the example, said transparent to light material is in the form of a plurality of elements formed by plates 12 made of PMMA, preformed and housed in said openings using the forming method described below with reference to FIG. 4. In the example shown, said openings are intercalatedly lined up along parallel rows 16.

With reference to FIG. 4, a formwork 13 was prepared by wholly coating the bottom 14 with a layer of compressible material, compatible with mortar and PMMA, such as non woven fabric, in order to prevent reflux and adhesion of the mortar to the section of the transparent plates. Said compressible material can be coated with a suitable layer of material with defined weft, such as a fabric, in order to obtain a finish with corresponding surface textures.

A plurality of elements of said transparent to light material in the form of plates 12 are positioned in an orderly arrangement within a formwork, according to parallel rows 16 using a frame formed by parallel movable rods 15 which can thus clamp the rows 16 of plates 12, lined up and spaced with templates, to hold them firmly in position.

The PMMA plates are obtained, for example, by laser cutting from plates of commercial sizes.

The frame is arranged so that the perimeter 17 of the formwork is left free of plates 12 so as to define a corresponding empty perimeter edge within it.

The formwork is then filled with cementitious mortar pouring it through the perimeter edge 17 left free of plates, until said plurality of plates 12 of transparent to light material appears completely buried in it without contacting with said mortar the opposite sides 19 and 20 of the plates 12, which thus remain free for their function. This is made possible for the side of the plate facing the bottom of the formwork through an action of pressure against this bottom on the non woven fabric, which thus produces a seal so as to prevent infiltration of mortar between the plates in that area. For the opposite side, the level of poured mortar will at the most reach the surface of this side of the plate.

The mortar is then left to harden, setting free said opposite sides 19 and 20 of the plates 12 suitable to form the inlet and the outlet of said corresponding opening 11 which thus remains identified in the formed panel, and the finished panel 10 is taken out of the formwork.

In order to strengthen the composite structure, in other embodiments a reinforcement is placed along the edges of the panel, or a metal lath, with mesh openings suitable not to interfere with the plates already positioned, can be laid.

Figure 1:
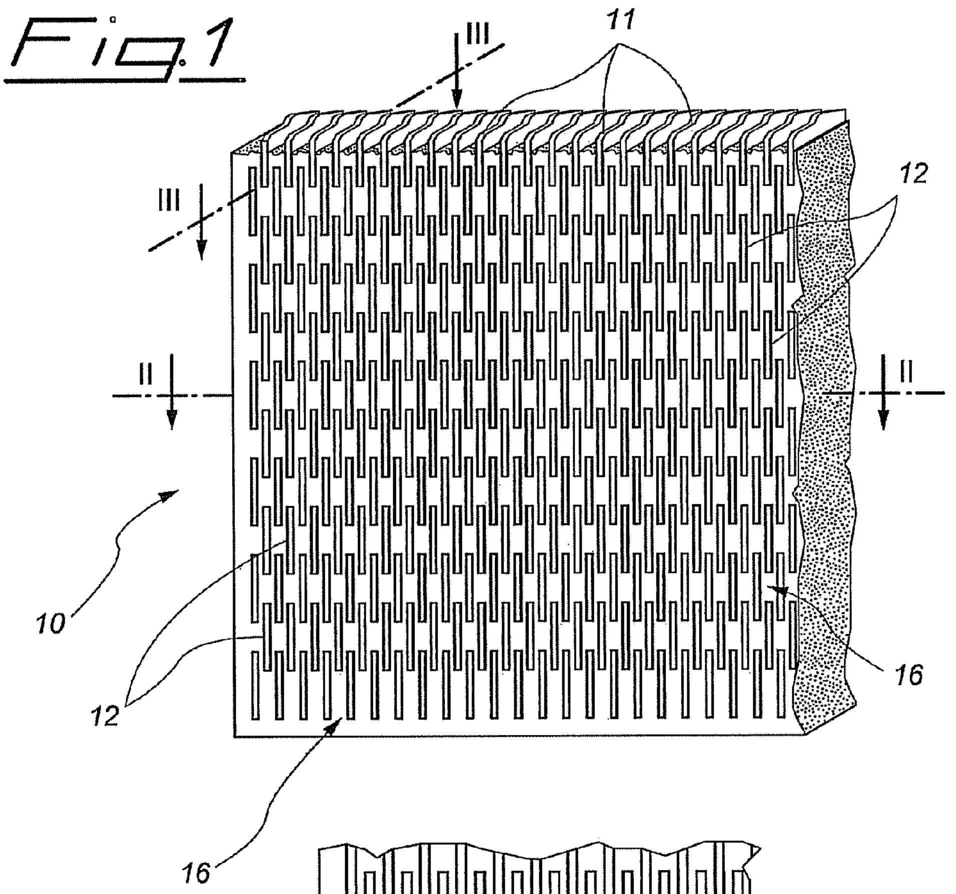
FIG. 1 shows a partial perspective view of a panel according to the invention.
Figure 2:
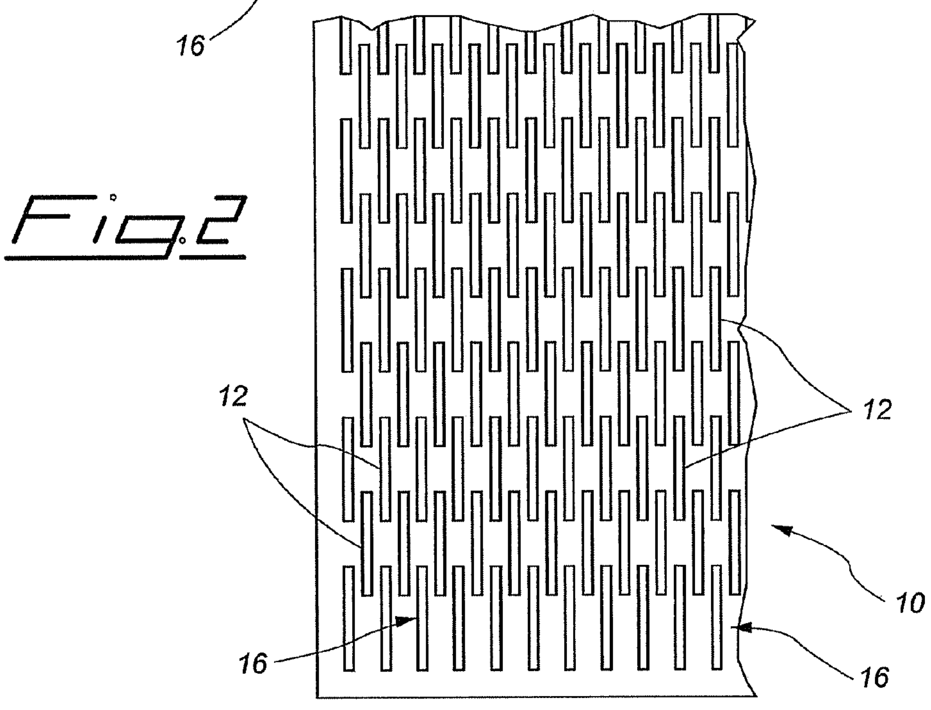
FIG. 2 shows a cross sectional view according to the line II-II of FIG. 1, partial and enlarged.
Figure 3:
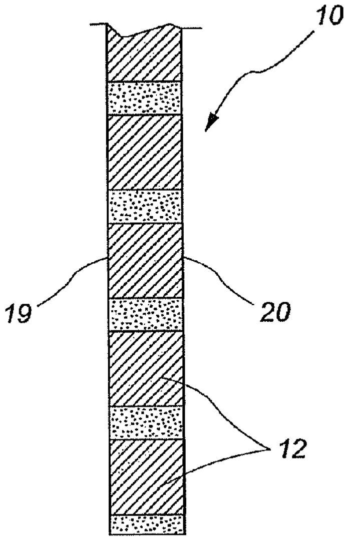
FIG. 3 shows a cross sectional view according to the line III-III of FIG. 1, partial and enlarged.
Figure 5:
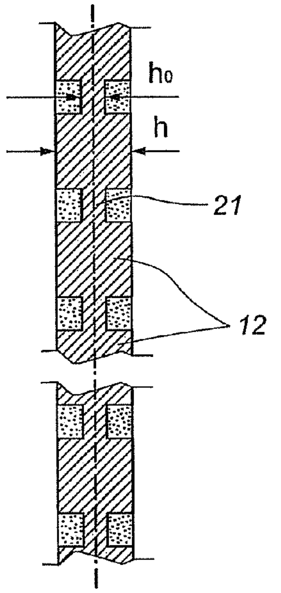
FIG. 5 shows a cross sectional view, identical to that of FIG. 3, of a variant of the invention.

In a further embodiment of the invention as shown in FIG. 5, said through openings are such that said transparent to light material that fills them is formed according to a single element 12 which extends continuously for a complete dimension, for example the height, of the panel 10. The dimension (h) of 12 in FIG. 5 matches the thickness of the panel 10 while $h_0 \leq 0.2$ h matches a thinner section 21 of the element 12 which identifies an interspace suitable to be filled with mortar during forming of the panel.

Also in this case, in a first embodiment of the variant said transparent to light material is in the form of a preformed element, for example by laser cutting of plates of commercial sizes, which is housed in a corresponding opening. In a second embodiment of the variant, said transparent to light material is an element formed in said opening, for example by casting in specific moulds.

The elements 12 according to the variant of FIG. 5, which are configured according to a sort of continuous chain of plates, are housed in formworks whose shorter opposite sides are comb-shaped in order to perform the function of template. These chains of plates can also be tensioned with the use of suitable means.

All cements described by the standard UNI-EN 197.1 can be used in the mortar for the purposes of the present invention. Preferably, type I cement in class 52.5R will be used.

The setting time of the cement becomes important in particular when using the method of preforming the openings through a suitable counter mould.

The time period for the beginning of setting can be regulated, for example by adding small quantities, no greater than 10% in mass with respect to the cement, of a sulfoaluminate binder. In a preferred aspect of the invention the sulfoaluminate binder marketed with the trade name ALIPRE by Italcementi is used.

The calcareous filler can be of any type, although the air separated type, i.e. obtained with an air classifier, is preferably used for the present invention.

The maximum diameter ranges between 60 and 70 μm, preferably 63 μm.

The aggregates can be of any nature, in conformity with the standard UNI EN 12620. The maximum diameter is influenced by the minimum distance between openings and can range between 1.5 and 5 mm, preferably 2 mm.

EXAMPLE

The method described above is implemented with reference to the accompanying drawings, or the alternative forming method also described above, using cementitious mortar of the high fluidity and shrinkage-compensated type, having the following composition:

| | field | Values chosen in the example |
|---|---|---|
| CEM I 52.5R + 5% of sulfoaluminate | 420-520 kg/m$^3$ | 470 kg/m$^3$ |
| Air separated calcareous filler | 230-330 kg/m$^3$ | 280 kg/m$^3$ |
| Aggregate (max. diameter 2 mm) | 1300-1400 kg/m$^3$ | 1315 kg/m$^3$ |
| w/c ratio | 0.45-0.55 | 0.5 |
| Superfluidifying additive | According to the technical data sheet | According to the technical data sheet |
| Shrinkage Reducing Admixture (SRA) | According to the technical data sheet | According to the technical data sheet |
| Expansive admixture | According to the technical data sheet | According to the technical data sheet |
| Polymer fibres to prevent cracking in the plastic phase | 1 kg/m$^3$ | 1 kg/m$^3$ |

As can be understood from the description and example indicated above, the panel produced according to the present invention is capable of achieving all the objects initially proposed: in particular, it is possible to avoid additional manufacturing steps, simplifying production, to avoid scrap and waste of material, and to obtain the desired transparency effect also with respect to unfavourable angles of incident light, or light diffused by reflection having a more limited luminous intensity with respect to direct light. This improved effect is apparent by comparing the aforesaid prior art panel with the panel of the invention with the same angle of incidence of the light beam.

The invention claimed is:

1. A composite panel made from cementitious mortar having a thickness, height, and width, comprising a plurality of openings passing through its thickness in an orderly arrangement where they are intercalatedly lined up along parallel rows, said openings having a height matching the panel thickness, each of said plurality of through openings being filled with a transparent to light material, as a preformed plate housed in said opening or as a plate formed in said opening, forming a plurality of transparent to light plates, said plurality of transparent to light plates being an interconnected chain of plates, each of said transparent to light plates along each row being formed as a single element having a first dimension which extends continuously to the height or width of the panel and a second dimension (h) matching the panel thickness except for at least one thinner section ($h_0$), said at least one thinner section defining interspaces to be filled with said cementitious mortar creating a non-continuous pattern along the first dimension at both thickness surfaces, wherein $h_0 \leq 0.2$ h.

2. The composite panel as claimed in claim 1, wherein said transparent to light material is provided with light reflection properties or treated with a coating having light reflection properties.

3. The composite panel as claimed in claim 1, wherein said transparent to light material is a plastic material.

4. The composite panel as claimed in claim 3, wherein said plastic material is selected from polmethymethacrylate, epoxy, and polycarbonate.

5. The composite panel as claimed in claim 1, wherein said transparent to light material is glass.

6. The composite panel as claimed in claim 1, wherein each of said openings is further defined by two additional dimensions, length and depth, said opening length ranges between 0.5 and 100 mm, said opening depth ranges between 0.5 and 5 mm, said parallel rows set apart from one another by distance ranging from 0.3 to 0.5 times the opening length.

7. The composite panel as claimed in claim 1, further comprising a suitably shaped strengthening metal lath having mesh openings suitable as not to interfere with the plates already positioned.

8. A method for producing the panel as claimed in claim 1, characterized by:

a) positioning in an orderly arrangement within a formwork a plurality of said plates of said transparent to light material, b) filling said formwork with said cementitious mortar unit said plurality of transparent to light plates appears completely buried in it without contacting with said mortar opposite sides of said plates, forming said plurality of through openings having a height (h) matching the panel thickness, c) hardening said mortar setting free said opposite sides of said transparent to light plates, and taking out the finished panel from the formwork.

9. A method for producing the panel as claimed in claim 1, characterized by:

a) positioning in an orderly arrangement within a formwork a plurality of cores suitable to form said openings until said plurality of cores appears completely buried in it without contacting with said mortar opposite sides of said cores, forming said plurality of through openings having a height (h) matching the panel thickness, b) during the time period from the beginning to the end of said mortar setting, taking out said cores from said formwork setting free thus formed said openings, c) filling said openings with fluid state said transparent to light material, d) allowing said mortar and said transparent to light material to harden into said plurality of light transmitting plates to afford said panel, and taking out the finished panel from the formwork.

10. The method for producing a panel as claimed in claim 8, further characterized by wholly coating the bottom of said formwork with a layer of non-woven fabric or equivalent sealing means.

11. The method for producing a panel as claimed in claim 9, further characterized by wholly coating the bottom of said formwork with a layer of non-woven fabric or equivalent sealing means.

* * * * *